United States Patent
Claus et al.

(10) Patent No.: US 7,133,067 B1
(45) Date of Patent: Nov. 7, 2006

(54) INSTRUMENT AND METHOD FOR DIGITAL IMAGE STABILIZATION

(75) Inventors: Michael Claus, Aalen (DE); Karl-Heinz Esswein, Aalen (DE)

(73) Assignee: Carl Zeiss Optronics GmbH, Oberkochen (DE)

( * ) Notice: Subject to any disclaimer, the term of this patent is extended or adjusted under 35 U.S.C. 154(b) by 674 days.

(21) Appl. No.: 09/715,133

(22) Filed: Nov. 20, 2000

Related U.S. Application Data

(63) Continuation of application No. 09/283,238, filed on Apr. 1, 1999.

(30) Foreign Application Priority Data

Apr. 3, 1998 (DE) .................................. 198 14 951

(51) Int. Cl.
*H04N 5/228* (2006.01)
*G03B 39/00* (2006.01)
*G03B 17/00* (2006.01)

(52) U.S. Cl. .................. 348/208.3; 348/208.6; 396/13; 396/55

(58) Field of Classification Search ......... 348/208.99, 348/208.2, 208.7, 208.3, 208.6; 396/7, 13, 396/55, 53, 54
See application file for complete search history.

(56) References Cited

U.S. PATENT DOCUMENTS

| | | | | |
|---|---|---|---|---|
| 4,612,575 A | | 9/1986 | Ishman et al. | |
| 4,959,725 A | | 9/1990 | Mandle | |
| 5,396,286 A | * | 3/1995 | Ishizuka | 348/208.6 |
| 5,521,638 A | * | 5/1996 | Dezaki et al. | 348/208.16 |
| 5,699,112 A | * | 12/1997 | Bacs, Jr. | 348/208.2 |
| 5,903,307 A | * | 5/1999 | Hwang | 348/208.1 |
| 6,053,109 A | * | 4/2000 | Rudenauer | 102/266 |
| 6,169,574 B1 | * | 1/2001 | Noguchi et al. | 348/208.16 |
| 2001/0012059 A1 | * | 8/2001 | Kudo | 348/208 |

FOREIGN PATENT DOCUMENTS

| | | | |
|---|---|---|---|
| DE | 36 21 897 | | 3/1987 |
| DE | 37 35 629 | | 5/1989 |
| DE | 3903417 | | 8/1990 |
| DE | 40 28 359 | | 3/1991 |
| EP | 0 456 672 | | 11/1991 |
| EP | 0543394 | | 5/1993 |
| EP | 0574228 | | 12/1993 |
| EP | 0737845 | | 10/1996 |
| FR | 2689354 | | 10/1993 |
| GB | 2116397 A | * | 9/1983 |
| GB | 2217649 | | 4/1984 |
| GB | 2 283 148 | | 4/1995 |

OTHER PUBLICATIONS

EPO Office Action Dec. 2005 (translation attached).

\* cited by examiner

*Primary Examiner*—Vivek Srivastava
*Assistant Examiner*—Justin Misleh
(74) *Attorney, Agent, or Firm*—Walter Ottesen

(57) ABSTRACT

The invention relates to a high-precision digital image stabilization of an image recording with a CCD sensor utilized in a moving or flying carrier. For the digital image stabilization, the movements of the carrier are detected with the aid of an inertial sensor and stored. Then, a correction of the image data is carried out based on the detected movements.

14 Claims, 2 Drawing Sheets

INSTRUMENT AND METHOD FOR DIGITAL IMAGE STABILIZATION

This is a continuation of application Ser. No. 09/283,238, filed Apr. 1, 1999.

FIELD OF THE INVENTION

The invention relates to an arrangement and a method for digitally stabilizing image recordings with a CCD sensor mounted in a moving or flying carrier.

BACKGROUND OF THE INVENTION

Stabilization systems known up to now operate in accordance with the electromechanical principle with a cardanic suspension of the sensor while driving the positioning motors via an inertial sensor; or, CCD sensors are utilized when making aerial image recordations without stabilization. Here, a migration of the images must be accepted for a line sensor between the lines or between frames with an area sensor. This image migration is caused by disturbing movements of the carrier.

Generally, it is possible to provide image stabilization on board or in a ground station. In the first case, there is an on-line stabilization for display on a monitor and, in the second case, there is an off-line image evaluation. As a rule, the on-line stabilization is carried out. This takes place with area sensors in camcorders. An on-line correction is carried out and analog signal processing takes place.

For example, European patent publication 0,543,394 discloses that, for an area sensor, the movements occurring at the time point of the exposure are corrected on-line in a frequency range of 1 to 12 Hz. The correction takes place via an optical element. The correcting signals are determined via two sensors which each measure the angular acceleration or the angular velocity.

Furthermore, U.S. Pat. No. 5,396,286 discloses the determination of vibrations in the horizontal and vertical directions. Here, an on-line correction is made either via readdressing or reading out from a storage register at a lower frequency than for writing.

Finally, U.S. Pat. No. 4,959,725 discloses a very complex circuit for correcting the video signal of an area sensor while performing an evaluation with accelerometers.

However, all known solutions of the state of the art cannot be characterized as optimal with respect to their commercial effectiveness because of the high cost associated therewith.

SUMMARY OF THE INVENTION

It is an object of the invention to provide an arrangement and a method for digital image stabilization with which the movement influences of a moving or flying carrier on the image quality of a sensor are compensated at low cost. The sensor moves or flies with the carrier. More specifically, a correction of the effects of roll and pitch of the aerial image carriers having line sensors and area sensors is made possible with at least pixel precision. This correction takes place digitally with large data quantities of >6,000 pixels per line and therefore takes place off-line and is economical.

The method of the invention is for digitally stabilizing an image recording with a CCD sensor, which is mounted in a moving or airborne carrier, for substantially eliminating unwanted movement influences of flight movements of the carrier on the image quality of the image recorded by the CCD sensor. The method includes the steps of: detecting an image with the CCD sensor and outputting image data; detecting the flight movements of the carrier as angular data with an inertial sensor and the inertial sensor being adapted to supply the angular data with a time delay; and, correcting the image data in accordance with the detected angular data with the image data being time delayed by a time interval relative to the detected angular data.

BRIEF DESCRIPTION OF THE DRAWINGS

The invention will now be described with reference to the drawings wherein.

DESCRIPTION OF THE PREFERRED EMBODIMENTS OF THE INVENTION

With the method and arrangement for digitally stabilizing an image in accordance with the invention, image stabilization can take place on board, that is, an on-line stabilization for display on a monitor or in a fixed ground station, that is, an off-line image evaluation.

Figure 1:
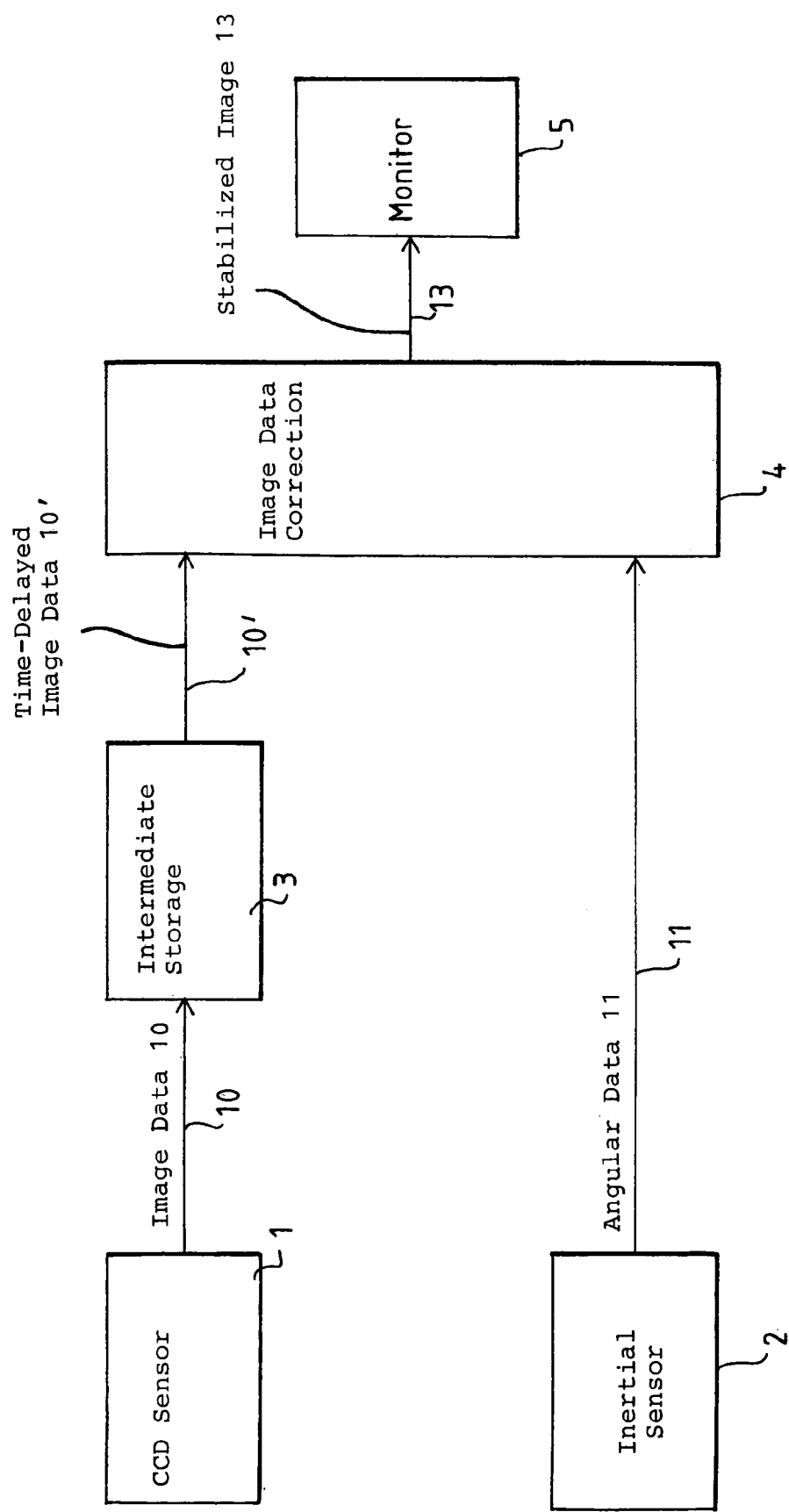
FIG. 1 is a block circuit diagram of an arrangement of the invention for an on-line stabilization of image recordings; and, FIG. 2 is a block circuit diagram of an arrangement for an off-line stabilization of the image recordings.
Figure 2:
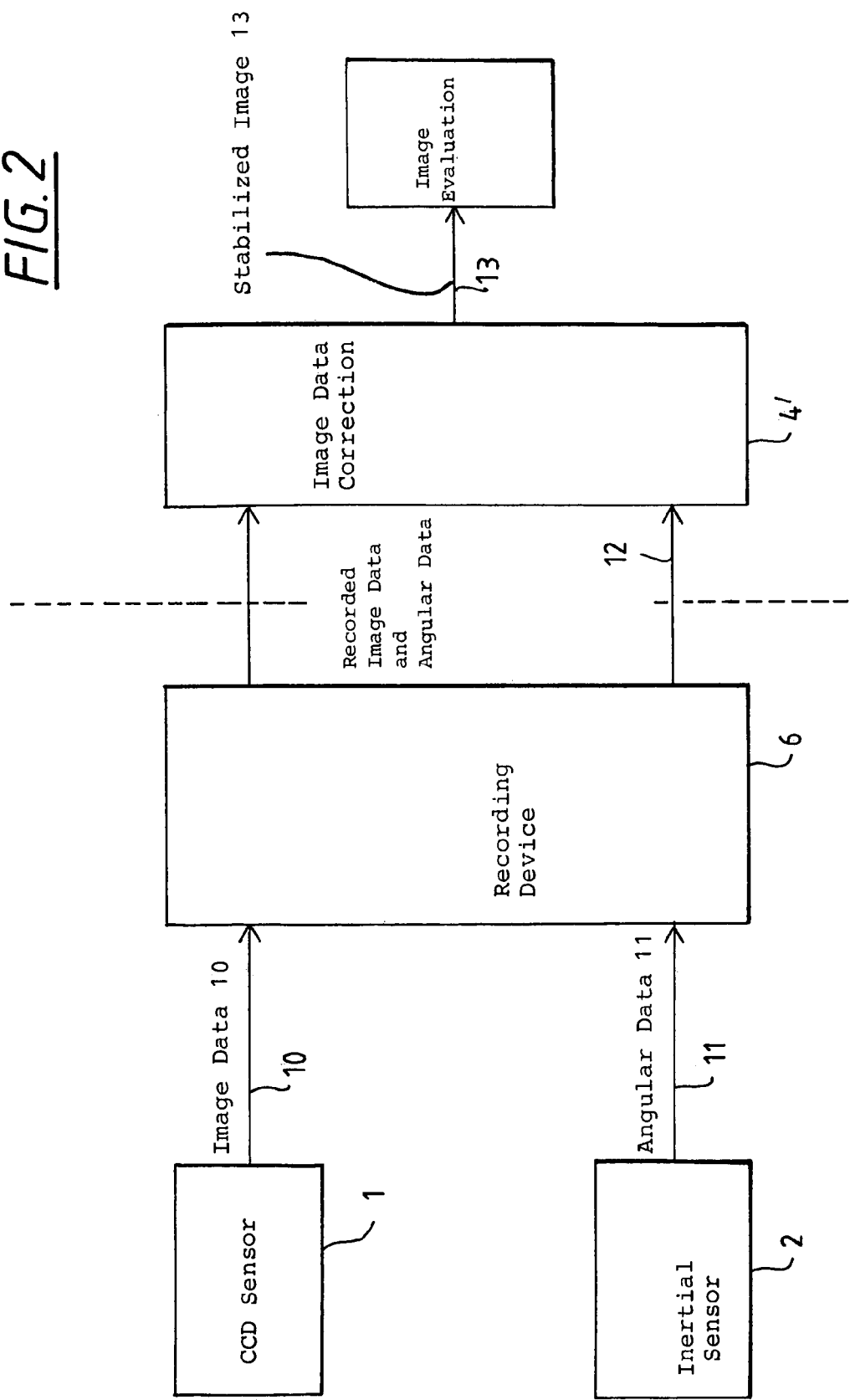

FIG. 1 shows a block circuit diagram of an on-line stabilization according to the invention and FIG. 2 shows a block circuit diagram of an off-line stabilization according to the invention. Here, the movements of the carrier during flight are detected as angle data 11 with the aid of an inertial sensor 2 and are, together with the image data 10, intermediately stored or recorded on a data carrier 3 or 6.

For an image data correction, image lines are displaced by corresponding angular increments transversely to the direction of flight for stabilization about the roll axis; whereas, a stabilization about the pitch axis takes place via an omission or a duplication of whole lines. The image data of neighboring pixels are interpolated in and transversely to the flight direction for a stabilization accuracy in the subpixel range.

The inertial sensor 2 detects the flying movements and can be a so-called "strap-down sensor". For this sensor, the stabilization result is essentially dependent upon the scale accuracy and the bandwidth of the sensor. The inertial sensor 2 has a finite bandwidth which is typically 100 Hz and therefore supplies the detected angular data 11 with a time delay. For this reason, its transmitting performance at low frequencies can be approached by a dead time element (linear phase, that is, phase lag proportional to frequency).

A dynamically calibrated gyro (DAK) is very well suited as an inertial sensor 2. With such devices, scale errors to 0.1% and bandwidths up to 100 Hz are achievable.

For an exemplary embodiment of a dynamically calibrated gyro (DAK), which is used as an inertial sensor 2, the pixel size of the sensor (dx) was 12 µm, the bandwidth of the objective (f) was 60 mm; the angular expansion of the sensor (DAS=dx/f) was 0.2 mrad and the line frequency was minimally 200 Hz and maximally 2,500 Hz. Sinusoidally-shaped disturbance excitations in the region of 10°/0.2 Hz to 0.2°/10 Hz have rotational increments of 12.5°/sec=220 mrad/sec.

For an exposure time of 0.4 ms, an image blurring of 0.09 mrad results which corresponds to 0.5 pixels; whereas, for an exposure time of 5 ms, an image blurring of 1.1 mrad results which corresponds to 5.5 pixels. Accordingly, an image blurring over several pixels must be accepted at low line frequencies which can no longer be corrected by the subsequent stabilization.

A total error or the quadratic sum of the residual error of the digital stabilization and the image blurring amounts to 0.22 mrad in dependence upon the line frequency or line rate (LR) for LR=2,500 Hz and to 1.12 mrad for LR=200 Hz. In this way, the following results for the stabilization factor:

| Disturbance Excitation: | Stabilization Factor for LR = 2,500 Hz (200 Hz) |
|---|---|
| 10°/0.2 Hz | 792 (155) |
| 0.2°/10 Hz | 16 (3) |

The computer simulation of a dynamically calibrated gyro (DAK) having a bandwidth of 100 Hz and a scale error of 0.1% has shown that the stabilization error of the corrected image is $\leq 0.2$ mrad (zero peak) for sinusoidally-shaped disturbance excitations in the range from 10°/0.2 Hz to 0.2°/10 Hz.

A digital image stabilization is therefore purposeful when the frequencies of the disturbance excitation are so low that no intense "blurring" occurs during the exposure time. The use of stabilization can be evaluated by the stabilization factor which is the amplitude ratio of disturbance excitation and residual image movement.

Especially even non-stabilized sensors can be economically expanded with an arrangement for digital image stabilization via corresponding modules and therefore made more valuable.

A digital image stabilization according to the invention can take place as an on-line stabilization (FIG. 1) for display on a monitor 5 or as an off-line stabilization in a fixed ground station. In the on-line stabilization, an inertial sensor 2 is provided on board and a device for intermediate storage 3 of image data as well as a device for image data correction 4. In the off-line stabilization, an inertial sensor 2 and an additional recording device 6 for angular sensor signals (angular data) are provided on board and, in the ground station, a device 4' is provided for carrying out an image correction in accordance with registered or recorded angular sensor signals (angle data).

The arrangement and method for digital image stabilization use especially the concept of storing or time delaying the image data. For image correction, the image data are delayed relative to the recorded angle data by a time delay interval which considers the time delay caused by the inertial sensor as well as by scanning and computer time.

For the on-line stabilization (on board the carrier) as shown in FIG. 1, a detection of image data 10 takes place via a CCD sensor. The CCD sensor is utilized in a moving or flying carrier. These image data 10 are intermediately stored in a device 3 and are outputted as time-delayed image data 10' to a device for image correction 4. Additionally, the device for image data correction 4 receives data from an inertial sensor 2 (angle data) which reflect the movements of the carrier. The device for image data correction 4 generates a stabilized image 13 from the delayed image data 10' and the angle data 11 and this stabilized image is displayed on a monitor 5 which likewise is disposed on board the carrier.

In the off-line stabilization as shown in FIG. 2, a detection of the image data 10 takes place via a CCD sensor 2 provided on board a moving or flying carrier. Furthermore, an inertial sensor 2 is configured on board the carrier which detects the flying movements of the carrier and outputs corresponding angular data 11. These angle data 11, together with the image data 10, are recorded in a recording device 6. For off-line evaluation and image data correction, the recorded image data and angle data 12 are outputted to a device for image data correction 4' in a ground station. This device for image data correction 4' delays the image data relative to the recorded angle data by a time interval which considers the time delay caused by the inertial sensor as well as by scanning and computation time.

With the measures explained above, the problematic of unwanted movement effects of a moving or flying carrier on the image quality of a sensor (which moves with or flies with the carrier) is solved in a very economical manner via digital stabilization.

A performance increase is achieved by an integration of the arrangement and method according to the invention into electrooptical sensor systems.

It is understood that the foregoing description is that of the preferred embodiments of the invention and that various changes and modifications may be made thereto without departing from the spirit and scope of the invention as defined in the appended claims.

What is claimed is:

1. A method for digitally stabilizing an image recording with a CCD sensor, which is mounted in a moving or airborne carrier, for substantially eliminating unwanted movement influences of flight movements of said carrier on the image quality of the image recorded by said CCD sensor, the method comprising the steps of:
   detecting an image with said CCD sensor and outputting image data;
   detecting said flight movements of said carrier as angular data with an inertial sensor having a finite bandwidth causing said inertial sensor to supply said angular data with a time delay;
   delaying said image data by a time interval which considers said time delay; and,
   correcting the delayed image data in accordance with said detected angular data to thereby eliminate the unwanted movement influences of said flight movements of said carrier.

2. The method of claim 1, comprising the further step of intermediately storing said image data from said CCD sensor on a data carrier to delay said image data by a time interval.

3. The method of claim 2, wherein the correction of said delayed image data is carried out as an on-line stabilization by performing the further step of displaying the corrected delayed image data as a stabilized image on a monitor on board said carrier.

4. The method of claim 1, comprising the further steps of:
   recording the detected angular data together with the image data from said CCD sensor on a data carrier; and,
   carrying out the correction of said delayed image data as an off-line evaluation in a fixed ground station.

5. The method of claim 1, wherein said time interval for delaying considers the time delay by said inertial sensor as well as by scanning and computation time.

6. The method of claim 1, wherein said inertial sensor is a strap-down sensor.

7. A method for digitally stabilizing an image recording with a CCD sensor, which is mounted in a moving or airborne carrier having a direction of flight, for substantially eliminating unwanted movement influences of flight movements of said carrier on the image quality of the image recorded by said CCD sensor, said flight movements including movements about a roll axis and a ditch axis, the method comprising the steps of:

detecting an image with said CCD sensor and outputting image data;

detecting said flight movements of said carrier as angular data with an inertial sensor and said inertial sensor being adapted to supply said angular data with a time delay;

correcting said image data in accordance with said detected angular data with said image data being time delayed by a time interval relative to said detected angular data; and shifting the image lines by pixels by the corresponding angular increments transversely to the direction of flight when correcting said image data to stabilize about the roll axis while stabilizing about the pitch axis takes place by omitting or reproducing whole lines.

8. An arrangement for digitally stabilizing an image recording with a CCD sensor, which is mounted in a moving or airborne carrier, for substantially eliminating unwanted movement influences of flight movements of said carrier on the image quality of the image recorded by said CCD sensor, the arrangement comprising:

said CCD sensor being provided to detect images and to output image data;

an inertial sensor for detecting movements of said carrier as angular data with a time delay caused by said inertial sensor having a finite bandwidth;

a first unit for delaying said image data by a time interval which considers said time delay; and, a second unit for correcting the delayed image data in accordance with said detected angular data to thereby eliminate the unwanted movement influences of said movements of said carrier.

9. The arrangement of claim 8, wherein said first unit is an intermediate store for delaying said image data by said time interval.

10. The arrangement of claim 8, wherein said second unit is mounted on board said carrier and is adapted to carry out an on-line stabilization; and, wherein said arrangement further comprises a monitor on board said carrier for displaying the corrected image data as a stabilized image.

11. The arrangement of claim 8, further comprising:

a unit for recording said angular data from said inertial sensor together with said image data on board said carrier; and, said second unit for correcting said image data being mounted in a fixed ground station and said second unit being adapted to carry out an off-line image evaluation.

12. The arrangement of claim 8, wherein the time interval for delaying considers the time delay by said inertial sensor as well as by scanning and computation time.

13. The arrangement of claim 8, wherein said inertial sensor is a strap-down sensor.

14. An arrangement for digitally stabilizing an image recording with a CCD sensor, which is mounted in a moving or airborne carrier having a direction of flight, for substantially eliminating unwanted movement influences of flight movements of said carrier on the image quality of the image recorded by said CCD sensor, said flight movements including movements about a roll axis and a pitch axis, the arrangement comprising:

said CCD sensor being provided to detect images and to output image data;

an inertial sensor for detecting movements of said carrier as angular data;

a first device for correcting said image data in accordance with said angular data; and, a second device for delaying said image data by a time interval relative to said detected angular data, wherein said first device is adapted to shift the image lines by pixels by the corresponding angular increments transversely to the direction of flight when correcting said image data to stabilize about the roll axis while stabilizing about the pitch axis takes place by omitting or reproducing whole lines.

\* \* \* \* \*

UNITED STATES PATENT AND TRADEMARK OFFICE
CERTIFICATE OF CORRECTION

| | | |
|---|---|---|
| PATENT NO. | : 7,133,067 B1 | Page 1 of 1 |
| APPLICATION NO. | : 09/715133 | |
| DATED | : November 17, 2006 | |
| INVENTOR(S) | : Michael Claus and Karl-Heinz Esswein | |

It is certified that error appears in the above-identified patent and that said Letters Patent is hereby corrected as shown below:

Column 5:
Line 2: delete "ditch" and insert -- pitch -- therefor.

Signed and Sealed this

Ninth Day of January, 2007

JON W. DUDAS
*Director of the United States Patent and Trademark Office*

UNITED STATES PATENT AND TRADEMARK OFFICE
CERTIFICATE OF CORRECTION

PATENT NO. : 7,133,067 B1
APPLICATION NO. : 09/715133
DATED : November 7, 2006
INVENTOR(S) : Michael Claus and Karl-Heinz Esswein It is certified that error appears in the above-identified patent and that said Letters Patent is hereby corrected as shown below:

Column 5:
Line 2: delete "ditch" and insert -- pitch -- therefor.

This certificate supersedes Certificate of Correction issued January 9, 2007.

Signed and Sealed this

Sixth Day of February, 2007

JON W. DUDAS
*Director of the United States Patent and Trademark Office*